United States Patent [19]

Scobie et al.

[11] Patent Number: 4,659,064
[45] Date of Patent: Apr. 21, 1987

[54] APPARATUS FOR FIXING THE POSITION OF A VALVE ELEMENT SHAFT IN A BORE

[75] Inventors: William B. Scobie; Dick R. Dodds, both of Houston, Tex.

[73] Assignee: Keystone International, Inc., Houston, Tex.

[21] Appl. No.: 892,785

[22] Filed: Aug. 1, 1986

[51] Int. Cl.⁴ .......................... F16K 41/02; F16K 1/22
[52] U.S. Cl. ................................... 251/214; 251/308; 277/105; 277/123; 403/261; 403/326
[58] Field of Search ............... 251/214, 305, 306, 307, 251/308; 277/105, 123; 403/261, 326

[56] References Cited

U.S. PATENT DOCUMENTS

| 3,149,524 | 9/1964 | Vecchi | 403/326 |
|---|---|---|---|
| 3,425,439 | 2/1969 | Duffey et al. | 251/308 |
| 3,588,154 | 6/1971 | Voight et al. | 403/326 |
| 3,602,340 | 8/1971 | Budzich et al. | 251/214 |
| 3,666,234 | 5/1972 | Scaramucci | 251/306 |
| 4,225,263 | 9/1980 | Asberg | 403/326 |
| 4,270,730 | 6/1981 | Hinrichs | 251/214 |
| 4,411,438 | 10/1983 | Scobie | 277/105 |
| 4,420,140 | 12/1983 | Gachot | 251/308 |
| 4,457,490 | 7/1984 | Scobie | 251/306 |
| 4,541,612 | 9/1985 | Yohner | 251/214 |

FOREIGN PATENT DOCUMENTS

| 2710104 | 9/1977 | Fed. Rep. of Germany | 251/308 |
|---|---|---|---|
| 689630 | 4/1953 | United Kingdom | 251/308 |

Primary Examiner—George L. Walton
Attorney, Agent, or Firm—Browning, Bushman, Zamecki & Anderson

[57] ABSTRACT

An apparatus for fixing the longitudinal position of a shaft, e.g., a valve stem, within the bore of a body, e.g., a valve body comprising a shaft having a plurality of peripherally extending, generally equally spaced, discrete grooves, the grooved portion of the shaft being received in the bore, a stop being provided internally of the bore, a washer having an inwardly tapered abutment surface engaging the stop, a split ring received on the shaft and engaging the inwardly tapered abutment surface, the apparatus further including a gland assembly including a second washer for engagement with the first washer, the gland assembly urging the second washer against the first washer, the split ring being forced into engagement with the abutment surface and into a groove adjacent the abutment surface. The apparatus is particularly useful in fixing the position of the stem in a butterfly valve to prevent a longitudinal force acting on the valve stem from forcing the disk out of its centered disposition with respect to the valve seat.

14 Claims, 7 Drawing Figures

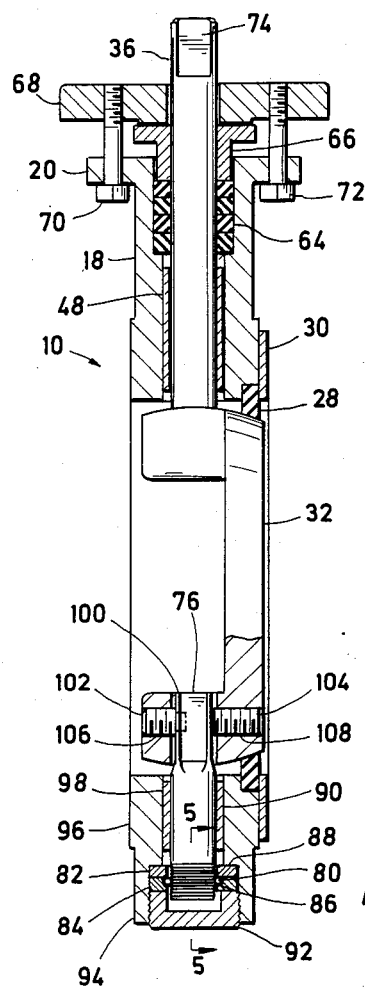
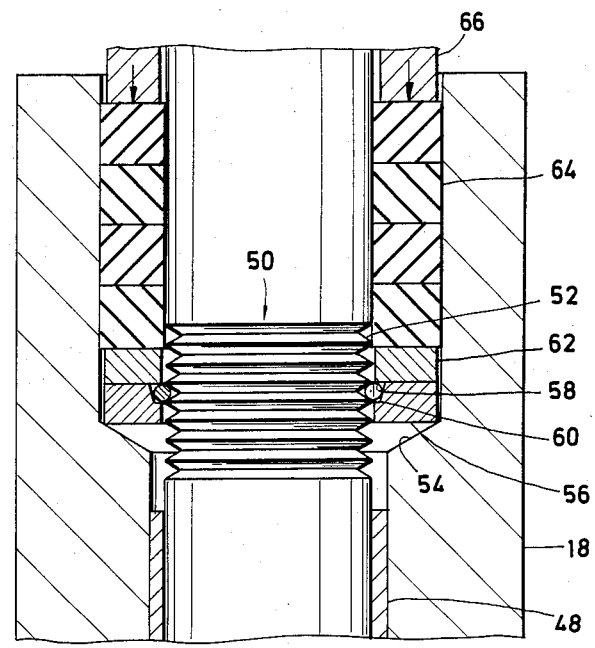
FIG. 3
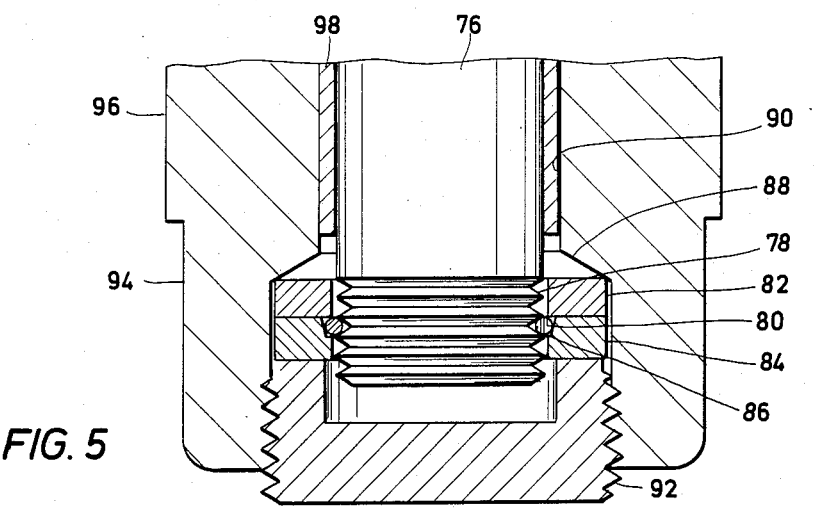
FIG. 4
FIG. 5

APPARATUS FOR FIXING THE POSITION OF A VALVE ELEMENT SHAFT IN A BORE

BACKGROUND OF THE INVENTION

1. Field of the Invention

The present invention relates to an apparatus for fixing the longitudinal position of a shaft in a bore and, more particularly, to an apparatus for mounting the valve stem of a fluid control valve in the valve body in such fashion as to maintain the valve element centered relative to the valve seat.

2. Description of the Prior Art

There are many instances when it is desirable to be able to fix the longitudinal position of a shaft in the bore of a body in such manner that axial forces will not cause relative shifting of the shaft in the bore. It is, of course, a requirement of most such mountings that the shaft continue to be free to rotate. One such instance is found in valves.

Valves employing pivotal closure elements, such as butterfly valves and the like, are widely used in industry for fluid handling control. In particular, butterfly valves employing resilient sealing means engaging rigid metal members are extensively used in a wide variety of environments since a good pressure tight seal can be obtained. This is due, at least in part, to the deflection or resiliency of the sealing means carried by either the valve disk or the valve body. However, even though a valve can initially be assembled such that the valve element, e.g. disk, is properly centered to seal, it is important that the disk remain centered or aligned with respect to the seat under the influence of axial forces acting on the stem(s) which rotatively mount the disk in the valve body. For example, actuators are frequently mounted on valves to control the disk. Often, in order to secure the actuator to the stem, a pounding force must be exerted on the actuator. The force translates into a force acting longitudinally on the valve stem which can move the disk out of its centered position with respect to the seat resulting in a tendency for the valve to leak.

SUMMARY OF THE INVENTION

The present invention overcomes the above-mentioned problems in fixing the longitudinal position of a shaft, e.g. a valve stem, with respect to a bore in a body, e.g. a valve body, in such a way that axial forms acting on the shaft are resisted.

In one embodiment, the present invention provides an apparatus for fixing the longitudinal position of an elongate shaft in a bore in a body comprising a means for providing a stop internally of the bore, means providing at least one inwardly tapered abutment surface, the means providing the tapered surface being in engagement with the stop means. A shaft is disposed in the bore, the shaft having a plurality of peripherally extending, generally equally spaced discrete grooves, the shaft being positioned in the bore such that the tapered surface is in generally surrounding relationship to at least one of the grooves. A split ring is received on the shaft and there are means received in the bore to urge the split ring into engagement with the tapered surface and at least one groove.

In a specific embodiment of the present invention, there is provided a valve comprising a valve body having a flow passage and at least one bore, a valve closure element being disposed in the flow passage to control flow of fluid through the flow passage. A valve stem is disposed in the bore and secured to the valve element. The valve stem has a plurality of peripherally extending, generally equally spaced, discrete grooves. The bore is provided with an internally disposed stop. There are means providing at least one inwardly tapered abutment surface in engagement with the stop, the valve stem being positioned in the bore such that the tapered surface is in generally surrounding relationship to at least one of the grooves. A split ring is received on the valve stem in surrounding relationship to the grooves and there are means received in the bore to urge the split ring into engagement with the tapered surface and at least one of the grooves.

BRIEF DESCRIPTION OF THE DRAWINGS

The present invention will now be described by way of example with reference to the accompanying drawings in which like parts are given like numbers and in which

FIG. 3 is an enlarged detailed section taken along line 3—3 of FIG. 1;

FIG. 4 is a section similar to FIG. 1 showing an alternate embodiment of the present invention;

FIG. 5 is an enlarged detailed section taken along line 5—5 of FIG. 4;

DETAILED DESCRIPTION OF THE PREFERRED EMBODIMENT

The present invention has been shown and described as it would be utilized in a butterfly or disk valve. It should be noted that the invention could be used in any type of valve having a valve element connected to a stem or shaft which is secured in a bore in the valve body. The invention also can be used anywhere it is desirable to fix the longitudinal position of a shaft relative to a bore in a body.

Figure 2:
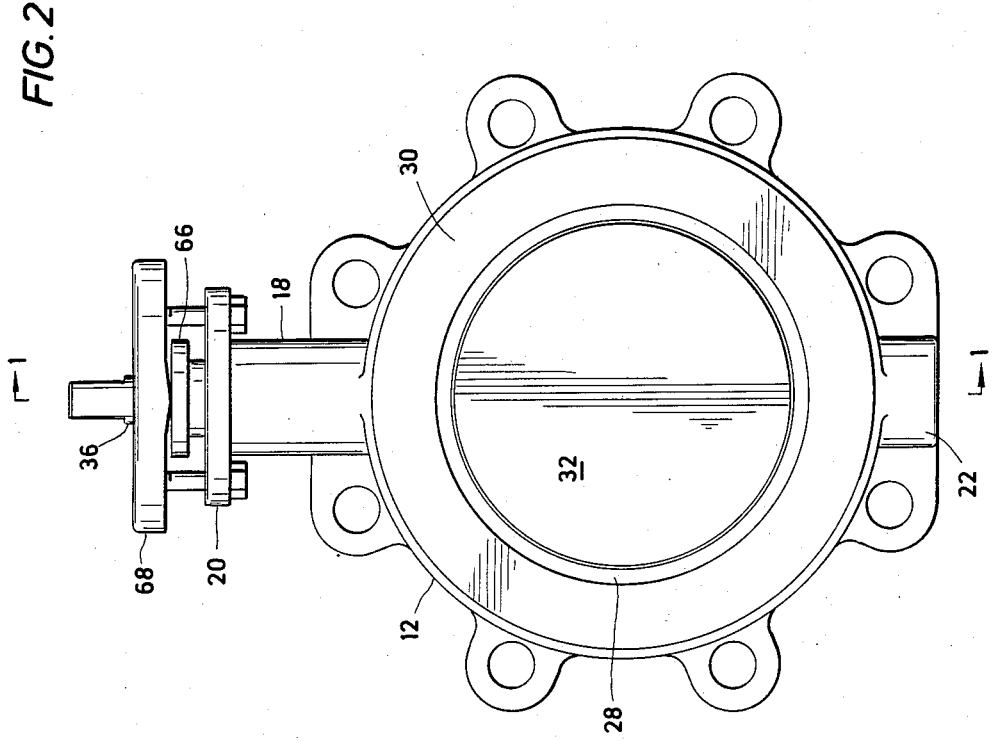
FIG. 2 is a plan view of the butterfly valve of FIG. 1.
Figure 1:
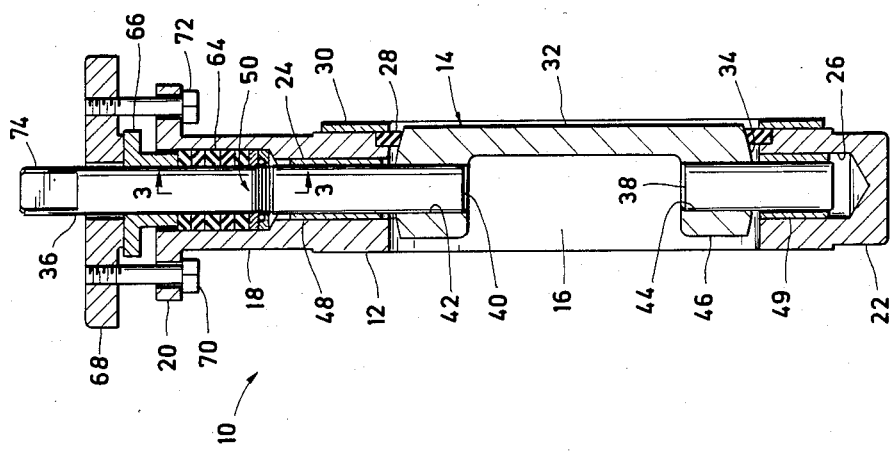
FIG. 1 is a section view through a butterfly valve incorporating the present invention and taken along line 1—1 of FIG. 2.

The valve 10 shown in FIGS. 1–3 is formed by a valve body 12 and a valve closure assembly 14. The valve body 12 is a rigid member defining a fluid flow passage 16 with a cylindrical neck 18 extending radially from one side of the body 12 and topped by an enlarged mounting flange 20. Diametrically opposite the cylindrical neck portion 18 is a boss 22. A first bore 24 is formed in the neck 18 and a second bore 26 is formed in the boss 22, both bores being in axial alignment along a diameter of passage 16. An annular seal 28 extends radially into the flow passage 16 along its circumference and is held against the body 12 by annular member 30 which is attached to body 12 by conventional means (not shown). The valve closure assembly 14 is formed by a valve closure element, e.g., a disk member 32 defining an annular sealing surface 34 which engages the seal 28. An upper stem 36 is received in the first bore 24 and a lower stem 38 is received in the second bore 26. The stems 36 and 38 are axially aligned by virtue of the bores 24, 26 and extend into the flow passage 16. The upper stem 36 has its lower end profiled and secured in the bore 40 of hub 42 by well known means such as, for example, described hereafter with respect to FIG. 4. In a similar fashion, the lower stem 38 has its upper end profiled and secured in the bore 44 of hub 46. The upper stem 36 passes through a bearing 48 and the lower stem 38 through bearing 49.

The upper stem 28 has an intermediate grooved portion 50 shown in greater detail in FIG. 3. The grooved portion 50 has a plurality of peripherally extending, generally equally spaced, discrete grooves 52. It should be emphasized that these are individual, parallel spaced, annular grooves and not a continuous helical groove. The dimensioning and configuration of these grooves will be discussed below. The bore 24 defines an internal shoulder 54 which forms a stop for a first apertured disk or washer 56 which fits over stem 36. Washer 56, which is generally flat, has an annular, inwardly directed, tapered abutment surface 60 formed around the periphery of the aperture. A split or snap ring 58 is received over stem 36 and engages a groove 52 and surface 60. A second apertured disk or washer 62, also generally flat, is received over stem 36 and into engagement with washer 56. Packing rings 64 are disposed to bore 24 around stem 36. A packing gland 66, annular cover 68 and bolts 70, 72 are used to compress the packing rings as disclosed in U.S. Pat. No. 4,411,438. The upper end of stem 36 is profiled at 74 to receive actuation means (not shown).

In this embodiment, the valve is assembled by inserting the lower stem 38 through the bore 44 in hub 46 into the bearing 49 in the bore 26. The lower stem is fixed to the hub by conventional means (not shown). The upper stem 36 is passed through the bore 24 and bearing 48 to be received in the bore 40 in hub 42. The upper stem 36 is then secured to the disk member 32 by conventional means (not shown). The disk 32 is then centered in flow passage 16 so as to generally uniformly engage the seal 28 around the periphery. The first washer 56 is positioned in the bore 24 (see FIG. 3) and rests against the shoulder 54. The split ring 58 is then moved along the stem 36 until it bottoms against the abutment surface 60 on the washer 56. In this position it will also be in surrounding relationship to the grooves 52 on stem 36. The second washer 62 is then slipped over stem 36. At this point, a tool is inserted to force washer 62 inwardly in bore 24. This will cause split ring 58 to be forced against tapered surface 60 forcing it to snap into a groove 52. The grooves 52 are dimensioned and shaped so as to receive the split ring 58 therein with the dimensioning and pitch (spacing) of the grooves being such that any two adjacent grooves 52 will provide seating of the split ring 58 within tolerance for centering of the disk member 32. The packing 64 is inserted into the bore 24 and the packing gland 66 secured thereagainst by the cover 68 and bolts 70, 72. It will be appreciated that the upper stem 36, and hence disk 32 and stem 38, will now be correctly located and maintained in their correct location by the engagement of the split ring 58 in the respective groove 52. In essence, split ring 58 is wedged between tapered surface 60 and groove 52. The engagement of the split ring 58 with stem 36 will prevent any axial movement of the stem 36 such as might occur with a worker hammering an actuator onto the top of the stem 36. Any force acting on stem 36 to urge stem 36 inwardly of bore 24 would result in the surface 60 tending to drive the split ring 58 into tighter engagement with the groove 52 thereby preventing longitudinal or axial movement of stem 36.

FIGS. 4 and 5 show an alternate embodiment of the present invention in which the lower stem 76 rather than the upper stem, as shown in FIGS. 1-3, is used to hold the disk in the centered position. Stem 76 is provided with a plurality of peripherally extending, generally equally spaced, discrete grooves 78. A split or snap ring 80 therein similar to ring 58 is received over stem 76 in surrounding relationship to groove 78. A pair of centrally apertured disks or washers 82, 84, similar to washers 62 and 56, respectively, are disposed in bore 90 in a manner described above with respect to washers 62 and 56. Washer 84 has an inwardly directed tapered surface 86. Washer 84 engages a plug 92 in the lower bore 90, plug 92 being threadedly received in the threaded end of bore 90. The bore 90 extends through boss 94 into the valve body 96 and is fitted with a bearing 98 to journal stem 76.

The assembly of this embodiment is similar to the assembly of the previously described embodiment in that following centering of the disk, washer 82 is inserted into the bore 90 over shaft 76 to rest against a shoulder 88 in bore 90. Snap ring 80 is fitted over the end of the stem 76 to engage tapered surface 86 surroundingly adjacent a groove 78. The second washer 84 is then inserted. By threading the plug 92 into the threaded portion of bore 90, ring 80 is forced into a groove 78. Any force acting on stem 76 toward plug 92 results in surface 86 urging ring 80 into the groove 78.

FIG. 4 also shows one means for securing a valve disk 32 to either the upper or lower valve stem. The assembly is described more fully in U.S. patent application Ser. No. 836,541 filed Mar. 5, 1986, entitled Disk/Stem Connection Apparatus For Butterfly Valves. Briefly, the lower valve stem 76 is shown with a profiled inner end 100 and threaded members 102, 104 are received in respective threaded bores 106, 108 on opposite sides of hub 46 to secure the stem 76 to the disk member 32 while allowing limited adjustment of the valve disk in the direction of the flow path through the valve.

Figure 6:
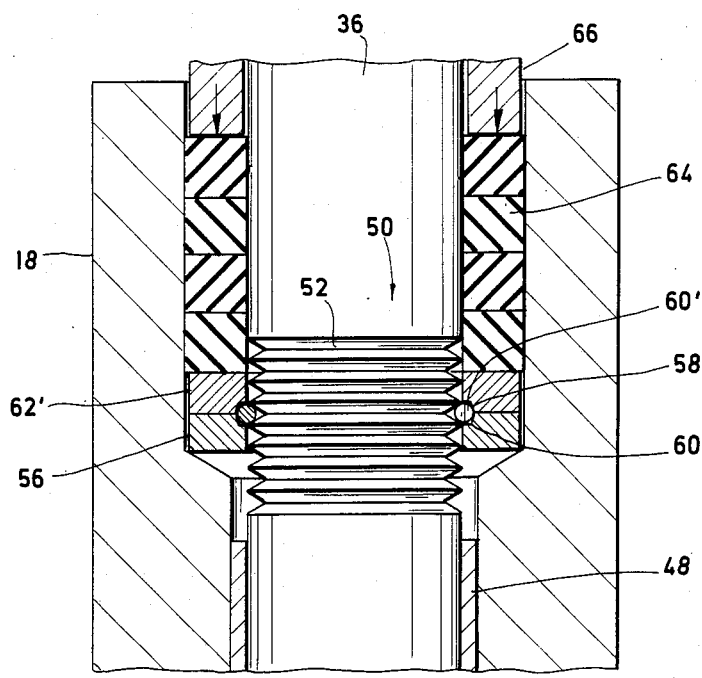
FIG. 6 is an enlarged detailed section similar to FIG. 3 showing a second alternate embodiment of the present invention.

FIG. 6 shows another alternative embodiment of the present invention. This embodiment differs from the embodiments of FIGS. 1-4 in that both washers 56, 62' are provided with inwardly tapered abutment surfaces 60, 60', respectively. An axial force on the valve stem 36 from either direction will cause one of the surfaces 60, 60' to wedge the split ring 58 into the groove 52 thereby assuring the ring 58 will be kept engaged in one of the grooves 52, preventing the stem 36 from shifting under the influence of an axial force. This embodiment would prevent longitudinal movement of the valve stem 36 in either axial direction, e.g., in either a blowout condition or a worker pounding an actuator onto profiled end 74.

Figure 7:
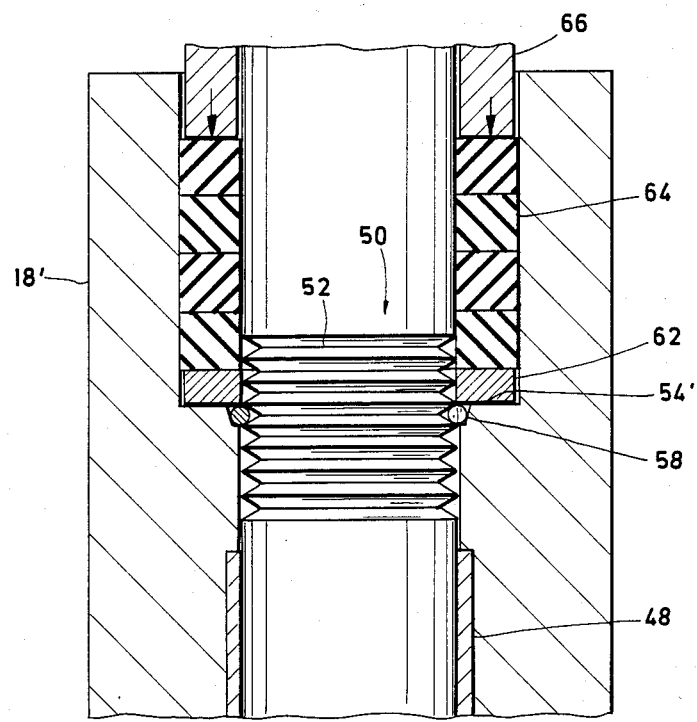
FIG. 7 is an enlarged detailed section similar to FIGS. 3 and 6 showing a third alternate embodiment of the present invention.

FIG. 7 shows another alternate embodiment in which one apertured disk or washer is eliminated and both the internal stop and inwardly tapered surface are formed in the valve body, the bore being profiled with an annular, frustoconical surface to perform the function of the tapered washer. In this embodiment, the shoulder 54' extends into close proximity to stem 36 and is profiled to have an inwardly tapered abutment surface. This embodiment would be assembled in similar fashion to the previous embodiments and would function in the same fashion.

Although the grooves, as for example grooves 52, are shown as being generally V-shaped when viewed in transverse cross section, it is to be understood that grooves having other configurations such as U-shaped, semi-circular, etc. can be used. It is only necessary that the groove provide an annular recess surrounding the shaft which is dimensioned such that when the split ring, e.g. ring 58 is received in the groove, a portion of the split ring 58 extends radially inwardly between the adjacent walls which form the grooves, i.e. it is only necessary that the groove be dimensioned such that when the split ring is in place, a portion of the split ring extends radially inwardly of the crests which form the groove.

The present invention may be subject to many modifications and changes without departing from the spirit or essential characteristics thereof. The above-described embodiments should therefore be deemed to be illustrative and not exclusive as to the scope of the invention which is defined by the appended claims.

What is claimed is:

1. Apparatus for fixing the longitudinal position of an elongate shaft in a bore in a body comprising:
   means providing a stop internally of said bore;
   abutment means disposed in said bore and providing at least one inwardly tapered abutment surface, said abutment means being in engagement with said stop means;
   a shaft disposed in said bore, said shaft having a plurality of peripherally extending, generally equally spaced, discrete grooves, said shaft being positioned in said bore such that said tapered surface is in generally surrounding relationship to at least one of said grooves;
   split ring means received on said shaft; and
   means received in said bore to urge and maintain said split ring in engagement with said tapered surface and said at least one groove whereby said split ring is wedged between said tapered surface and said at least one groove thereby restraining relative axial movement between said shaft and said body.

2. The apparatus of claim 1 wherein said stop comprises a shoulder formed on said body in said bore.

3. The apparatus of claim 2 wherein said shoulder comprises said inwardly tapered abutment surface.

4. Apparatus according to claim 1 wherein said abutment means comprises a first washer member received on said shaft, said first washer member having a central aperture, said at least one inwardly tapered abutment surface being formed about the periphery of said aperture in said first washer member.

5. The apparatus of claim 4 wherein said means to urge such split ring into engagement with said tapered surface comprises a second washer member received on said shaft, said second washer member engaging said first washer member, and wherein there are means to urge said second washer member against said first washer member.

6. The apparatus of claim 5 wherein said second washer member has a central aperture and there is a second inwardly tapered abutment surface formed around the periphery of said aperture in said second washer member, said first and second washer members being disposed such that said first and second tapered abutment surfaces form an annular, generally radially outwardly extending recess in generally surrounding relationship to said grooves.

7. The apparatus of claim 1 wherein said grooves are generally V-shaped when viewed in transverse cross section.

8. A valve comprising:
   a valve body having a flow passage and at least one bore;
   a valve stem disposed in said bore, said stem having a plurality of peripherally extending, generally equally spaced, discrete grooves;
   a valve closure element disposed in said flow passage to control flow of fluid through said bore, said valve element being secured to said stem;
   means providing a stop internally of said bore;
   abutment means disposed in said bore and providing at least one inwardly tapered abutment surface, said abutment means being in engagement with said stop means, said valve stem being positioned in said bore such that said tapered surface is in generally surrounding relationship to at least one of said grooves;
   split ring means received on said valve stem; and
   means received in said bore to urge and maintain said split ring in engagement with said tapered surface and said at least one groove whereby said split ring is wedged between said tapered surface and said at least one groove thereby restraining relative axial movement between said valve stem and said valve body and maintaining the position of said valve element in said valve body.

9. The valve of claim 8 wherein said stop comprises a shoulder formed on said body in said bore.

10. The valve of claim 9 wherein said abutment means comprises a first washer member received on said shaft, said first washer member having a central aperture, said at least one inwardly tapered abutment surface being formed about the periphery of said aperture in said first washer member.

11. The valve of claim 10 wherein said means to urge said split ring into engagement with said tapered surface comprises a second washer member received on said shaft, said second washer member engaging said first washer member, and wherein said means to urge said split ring into engagement with said tapered surface comprises means to urge said second washer member against said first washer member.

12. The valve of claim 11 wherein said second washer member has a central aperture and there is a second inwardly tapered abutment surface formed around the periphery of said aperture in said second washer member, said first and washer members being disposed such that said first and second tapered abutment surfaces form a generally radially outwardly extending recess in generally surrounding relationship to said groove.

13. The valve of claim 8 wherein said grooves are generally V-shaped when viewed in transverse cross section.

14. The valve of claim 8 wherein said valve closure element comprises a disk.

* * * * *